United States Patent
Paturle

(10) Patent No.: US 11,752,812 B2
(45) Date of Patent: Sep. 12, 2023

(54) METHOD FOR CHECKING AND/OR MONITORING THE USE OF A TIRE

(71) Applicant: COMPAGNIE GENERALE DES ETABLISSEMENTS MICHELIN, Clermont-Ferrand (FR)

(72) Inventor: Antoine Paturle, Clermont-Ferrand (FR)

(73) Assignee: COMPAGNIE GENERALE DES ETABLISSEMENTS MICHELIN, Clermont Ferrand (FR)

(*) Notice: Subject to any disclaimer, the term of this patent is extended or adjusted under 35 U.S.C. 154(b) by 1023 days.

(21) Appl. No.: 16/462,778

(22) PCT Filed: Nov. 17, 2017

(86) PCT No.: PCT/FR2017/053157
§ 371 (c)(1),
(2) Date: May 21, 2019

(87) PCT Pub. No.: WO2018/091849
PCT Pub. Date: May 24, 2018

(65) Prior Publication Data
US 2019/0366784 A1    Dec. 5, 2019

(30) Foreign Application Priority Data
Nov. 21, 2016 (FR) ...................................... 1661330

(51) Int. Cl.
*B60C 23/06* (2006.01)
*G01M 17/02* (2006.01)
*B60C 11/24* (2006.01)

(52) U.S. Cl.
CPC .......... *B60C 23/062* (2013.01); *B60C 11/246* (2013.01); *G01M 17/02* (2013.01)

(58) Field of Classification Search
CPC ..... B60C 11/24; B60C 11/246; B60C 23/002; B60C 23/06; B60C 23/062; G01M 7/08; G01M 17/02; G01N 29/14; G01N 29/44
See application file for complete search history.

(56) References Cited

U.S. PATENT DOCUMENTS 6,064,931 A * 5/2000 Sawada ................... B60T 8/172
                                                                                         73/11.01
6,385,553 B1 * 5/2002 Naito ..................... B60C 23/062
                                                                                        73/146.2

(Continued)

FOREIGN PATENT DOCUMENTS

CA         2325139 A1    6/2001
DE    102015208270 A1    11/2016

(Continued)

OTHER PUBLICATIONS

International Search Report dated Jan. 10, 2018, in corresponding PCT/FR2017/053157 (6 pages).

*Primary Examiner* — Feba Pothen
*Assistant Examiner* — Martin Walter Braunlich
(74) *Attorney, Agent, or Firm* — VENABLE LLP

(57) ABSTRACT

A method for checking and/or monitoring the use of a tire (1) mounted on a vehicle (7), comprises the following steps: acquisition, by a microphone (10) arranged inside the tire, of an acoustic response of said tire (1) obtained under the effect of a pulsed mechanical stress thereon, and processing of said response in the frequency domain, characterized in that said processing identifies, in the response in the frequency domain, two spectrum spikes situated on either side of a reference frequency corresponding to the first cavity mode of the tire and, as a function of the frequency deviation between the two duly identified spikes, determines information relating to at least one parameter of use of the tire.

13 Claims, 4 Drawing Sheets

(56) References Cited

U.S. PATENT DOCUMENTS

| | | |
|---|---|---|
| 8,731,767 B2 | 5/2014 | Paturle |
| 8,833,410 B2 | 9/2014 | Paturle |
| 8,881,573 B2 | 11/2014 | Paturle et al. |
| 8,892,298 B2 | 11/2014 | Paturle et al. |
| 8,904,869 B2 | 12/2014 | Paturle |
| 9,764,602 B2 | 9/2017 | Paturle |
| 2005/0076987 A1* | 4/2005 | O'Brien ............ B60C 23/06 152/415 |
| 2012/0010776 A1 | 1/2012 | Paturle |
| 2012/0266650 A1 | 10/2012 | Paturle |
| 2012/0273102 A1 | 11/2012 | Paturle |
| 2014/0025251 A1 | 1/2014 | Clasquin et al. |
| 2014/0121997 A1 | 5/2014 | Paturle |
| 2014/0124108 A1 | 5/2014 | Paturle |
| 2014/0174613 A1 | 6/2014 | Paturle et al. |
| 2016/0282227 A1* | 9/2016 | Shen .................. G01M 17/025 |
| 2016/0349219 A1 | 12/2016 | Paturle et al. |

FOREIGN PATENT DOCUMENTS

| | | | |
|---|---|---|---|
| EP | 1261499 B1 | 1/2001 | |
| EP | 0937615 B1 * | 7/2011 | ............ B60T 8/1725 |
| JP | 2002-148133 A | 5/2002 | |
| JP | 2005-343204 A | 12/2005 | |
| KR | 100249078 B1 * | 4/2000 | ............ G01H 17/00 |
| WO | 2010/106297 A1 | 9/2010 | |

* cited by examiner

METHOD FOR CHECKING AND/OR MONITORING THE USE OF A TIRE

The present invention relates to the checking and/or monitoring of the use of a tyre.

More specifically, the invention proposes a method which exploits the acoustic response of a tyre under the effect of a pulsed mechanical stress to deduce therefrom information relating to at least one parameter of use of the tyre such as the pressure thereof or the load of the vehicle.

It is advantageously applicable for checking and/or monitoring any type of tyre:

tyres of agricultural equipment, of trucks, of passenger vehicles, of motorbikes or quadbikes, etc.

It is conventionally known that when a tyre is mounted on a vehicle, it is important to monitor not only its wear, but also the conditions under which it is used: inflation pressure, load of the vehicle, etc.

The wear of a tyre can easily be checked by a simple visual inspection of the sculptures hollowed out in the tread or, if necessary, by using a tool of depth gauge type.

The parameters of use such as the pressure of the tyre or the load of the vehicle are, for their part, more difficult to apprehend, or, in any case, require costly equipment, particularly because of the large number of wheels of a truck, for which the authorized total loaded weight is greater than 3.5 tonnes, but can rise to beyond 26 tonnes, even 32 tonnes, which requires additional axles. The checking or monitoring thereof requires the use of complex tools (pressure gauge, weighing machine for weighing the vehicle, etc.).

There is therefore a need for a technique for checking and/or monitoring the conditions of use of a vehicle tyre which makes it possible to obtain information relating to at least one parameter of use of the tyre in a particularly simple way, without requiring big and expensive tools.

SUMMARY OF THE INVENTION

One aim of the invention is to make it possible to check and/or monitor the conditions of use of a vehicle tyre in a way that is simple to implement and inexpensive.

Yet another of benefit the invention is to enable a checking technique which makes it possible to reliably determine information relating to at least one parameter of use of the tyre.

To this end, a method is proposed for checking and/or monitoring the use of a tyre mounted on a vehicle, comprising the following steps:

acquisition, by a microphone arranged inside the tyre, of an acoustic response of said tyre obtained under the effect of a pulsed mechanical stress on said tyre when stopped, processing of said acoustic response in the frequency domain performed by a computerized data processing unit, in which the processing identifies, in the response in the frequency domain, two spectrum spikes situated on either side of a reference frequency corresponding to the first cavity mode of the tyre and, as a function of the frequency deviation between the two duly identified spikes, determines information relating to at least one parameter of use of the tyre.

This method is advantageously complemented by the following features, taken alone or in any technically possible combination thereof:

each of the two spikes of the spectrum corresponds to maxima of the spectrum on their respective side of the reference frequency;

the spacing of the frequency of each of the spikes relative to the reference frequency is less than 10% of the reference frequency;

the information relating to at least one parameter of use of the tyre is a deformation factor corresponding to the ratio between the deviation between the two frequencies of the spikes of the spectrum and the reference frequency;

the reference frequency is defined as the ratio of the speed of sound in air to the average internal circumference of the tyre;

the microphone is linked to a wireless transmitter, and the acoustic response is transmitted by the wireless transmitter to the computerized data processing unit, said computerized data processing unit being arranged outside of the tyre;

the microphone is secured to a rim bearing the tyre;

the pressure inside the tyre is known, and the method comprises the determination of information relating to a load of the vehicle as parameter of use, as a function of the deviation between the frequencies of the spikes of the spectrum and of the pressure;

the load of the vehicle is known, and the method comprises the determination of information relating to a pressure as parameter of use, as a function of the deviation between the frequencies of the spikes of the spectrum and of the load of the vehicle.

The invention relates also to a computer program product comprising program code instructions for executing the method according to the invention, when said program is run on a computer. Preferably, the computer program product takes the form of a computer-readable device forming a non-volatile memory storing the program code instructions.

The invention relates also to a system for checking and/or monitoring the use of a tyre mounted on a vehicle, said system comprising:

a microphone arranged inside the tyre and suitable for acquiring an acoustic response of said tyre to a pulsed mechanical stress thereon, a computerized data processing unit configured to identify, on the response in the frequency domain, two spikes of the spectrum situated on either side of a reference frequency corresponding to the first cavity mode, and, as a function of the frequency deviation between the two duly identified spikes, determine information relating to at least one parameter of use of the tyre.

The system is configured to implement the method according to any one of the possible embodiments of the invention. Preferably, the microphone is secured to a rim bearing the tyre. Preferably, the microphone is linked to a wireless transmitter configured to transmit the acoustic response to the computerized data processing unit, said computerized data processing unit being arranged outside of the tyre.

DESCRIPTION OF THE FIGURES

Other features, aims and advantages of the invention will emerge from the following description, which is purely illustrative and nonlimiting, and which should be read in light of the attached drawings in which.

DETAILED DESCRIPTION

General Recaps on the Structure of a Tyre

Figure 1:
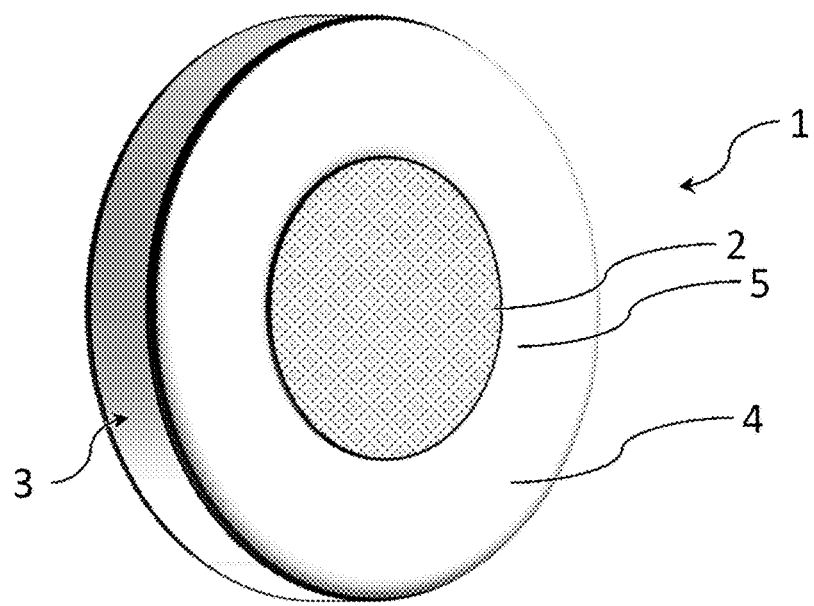
FIG. 1 schematically illustrates a tyre mounted on a rim of a vehicle.

FIG. 1 illustrates a tyre 1 mounted on a rim 2. Such a tyre 1 comprises, on the one hand, a crown zone 3 constituting a tread having sculptures and, on the other hand, side walls 4 terminating in low zones 5. The latter generally include a bead wire and a bead to allow the tyre 1 to be mounted on the rim 2. The rim 2 is itself linked to the vehicle by an axle (not represented). The tyre thus allows the link between the vehicle and the ground.

A tyre 1 is comprises flexible jacket enclosing a pressurized gassy interior, typically air.

Figure 2:
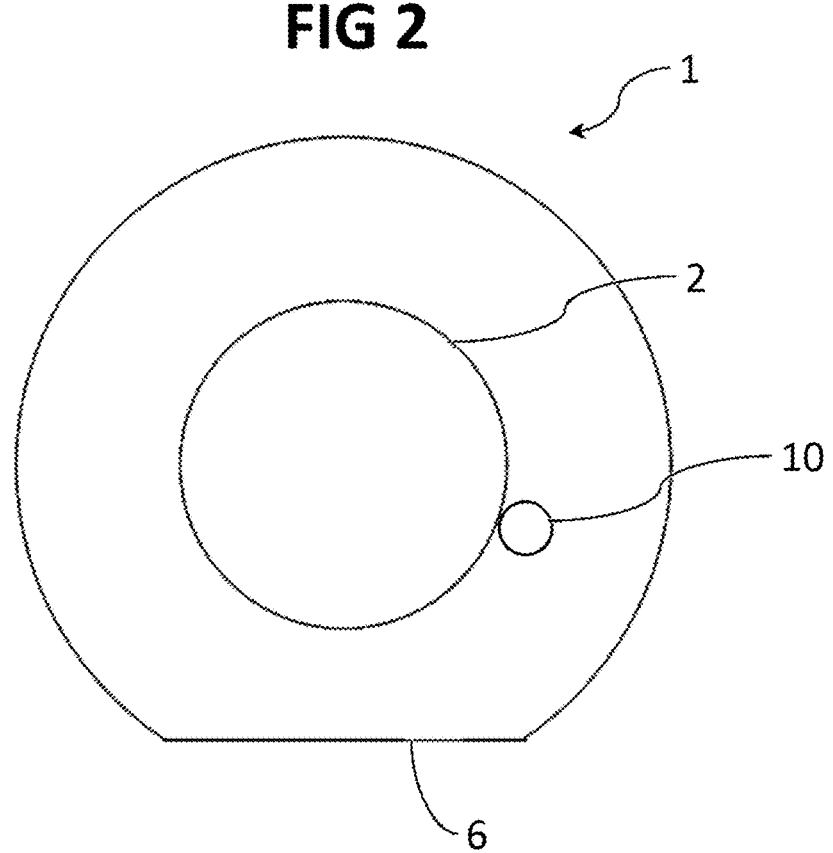
FIG. 2 schematically illustrates the deformation undergone by a tyre provided with a microphone according to a possible embodiment of the invention, FIG. 3 schematically illustrates a system according to an embodiment of the invention applied to an agricultural vehicle.

Since the rim 2 is not deformable, this force applied to the tyre 1 deforms the latter, as illustrated in FIG. 2. The part of the crown 3 under the rim 2 is flattened, which increases the surface area of contact of the tyre with the ground, while the side walls 4 inflate: the tyre 1 is deformed. This deformation is all the more pronounced when the pressure is low and the load is high. Likewise, the pressure is all the greater when the load is high. It is therefore understood that parameters of use such as the deformation of the tyre, the pressure of the tyre or the load of the vehicle are linked to one another.

Example of a System

Figure 3:
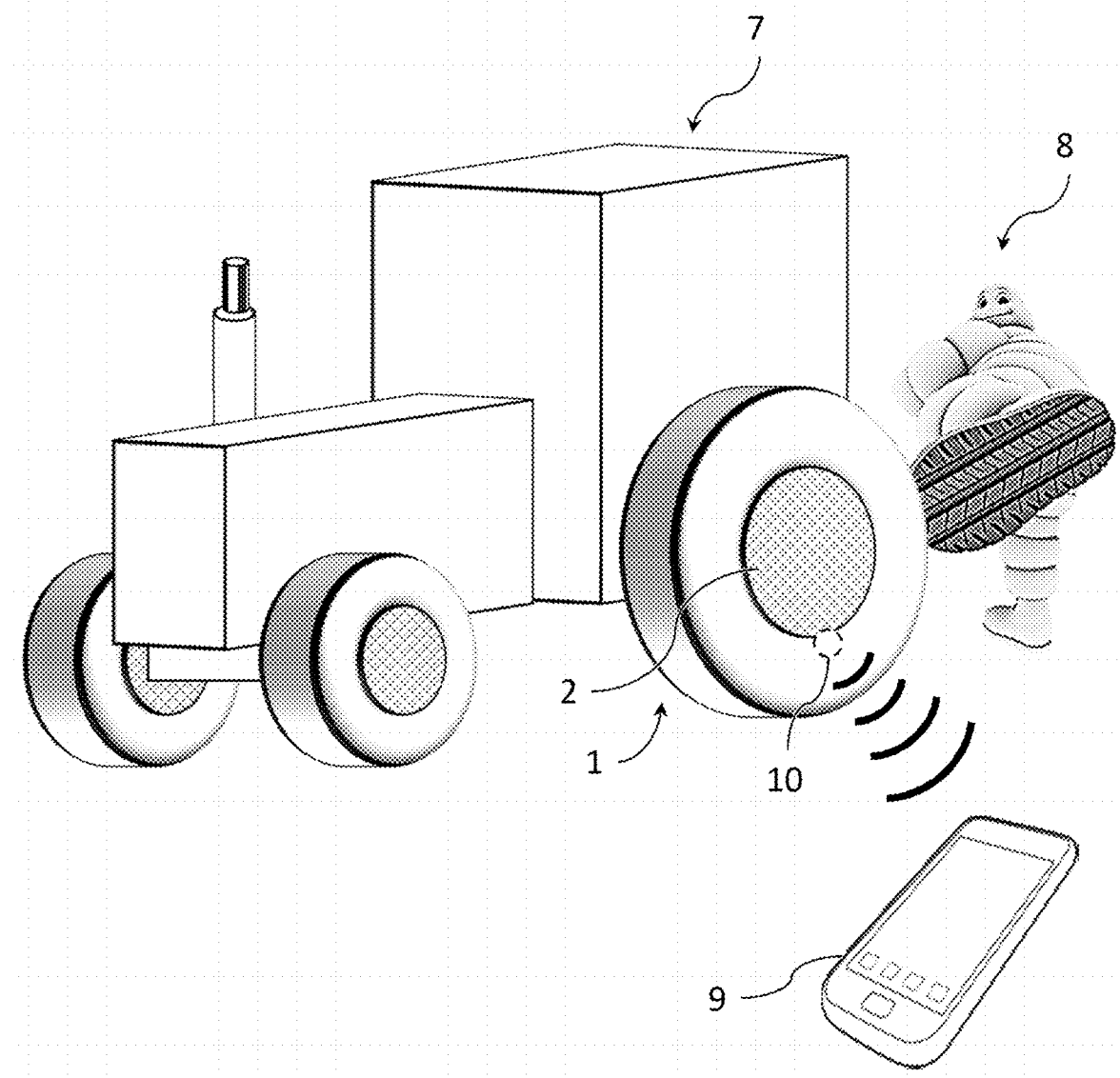

Referring to FIG. 3 which schematically illustrates a system according to an embodiment of the invention applied to an agricultural vehicle, such a system comprises a microphone 10 and a computerized data processing unit 9. They can, as here, be separate and distinct, or else be arranged within one and the same device. Preferably, the microphone 10 and the computerized data processing unit 9 are physically distinct. It is thus possible to use as microphone a dedicated recording device, making it possible to more finely configure the acquisition and, as computerized data processing unit 9, a generic terminal such as a pocket terminal or "smartphone". As illustrated, the computerized data processing unit 9 can be a pocket terminal such as a smart mobile telephone, comprising a processor and a memory. It can also be a computer comprising a processor and a memory. In particular, the computerized data processing unit 9 can be a computer on board the vehicle on which the tyre is mounted.

Moreover, having a microphone 10 and a computerized data processing unit 9 that are physically distinct makes it possible to arrange them at different points. As illustrated in FIG. 2, the microphone 10 is arranged inside the tyre, that is to say inside the cavity defined by the tyre and which encloses the pressurized air. More specifically, the microphone 10 is, here, secured to the rim 2. The microphone can for example be fixed to a collar encircling the well of the rim inside the tyre 1.

Preferably, the microphone 10 is associated with a wireless transmitter, in particular of radiofrequency type, making it possible to relay the recording of the acoustic response to the computerized data processing unit 9, preferably arranged outside of the tyre 1, for the processing thereof. It is thus possible, for example, to provide an antenna inside the tyre. In the case of a wireless communication, an external receiver can receive the signals sent by the wireless communication means linked to the microphone 10, and relay them to the computerized data processing unit 9. Once again, an accessory of a pocket terminal such as a smart mobile telephone can serve both as external receiver and as computerized data processing unit 9, as illustrated in the example of FIG. 3.

The microphone 10 is suitable for acquiring an acoustic response of said tyre 1 to pulsed mechanical stress thereon, when the tyre is stopped. The microphone 10, arranged inside the tyre 1, is also configured to transmit the acoustic response to the computerized data processing unit 9, arranged outside of the tyre 1.

The computerized data processing unit 9 is, for its part, configured to identify, in the response in the frequency domain, two spikes of the spectrum situated on either side of a reference frequency corresponding to the first cavity mode, and, as a function of the frequency deviation between the two duly identified spikes, determine information relating to at least one parameter of use of the tyre 1.

Example of Implementation

Figure 4:
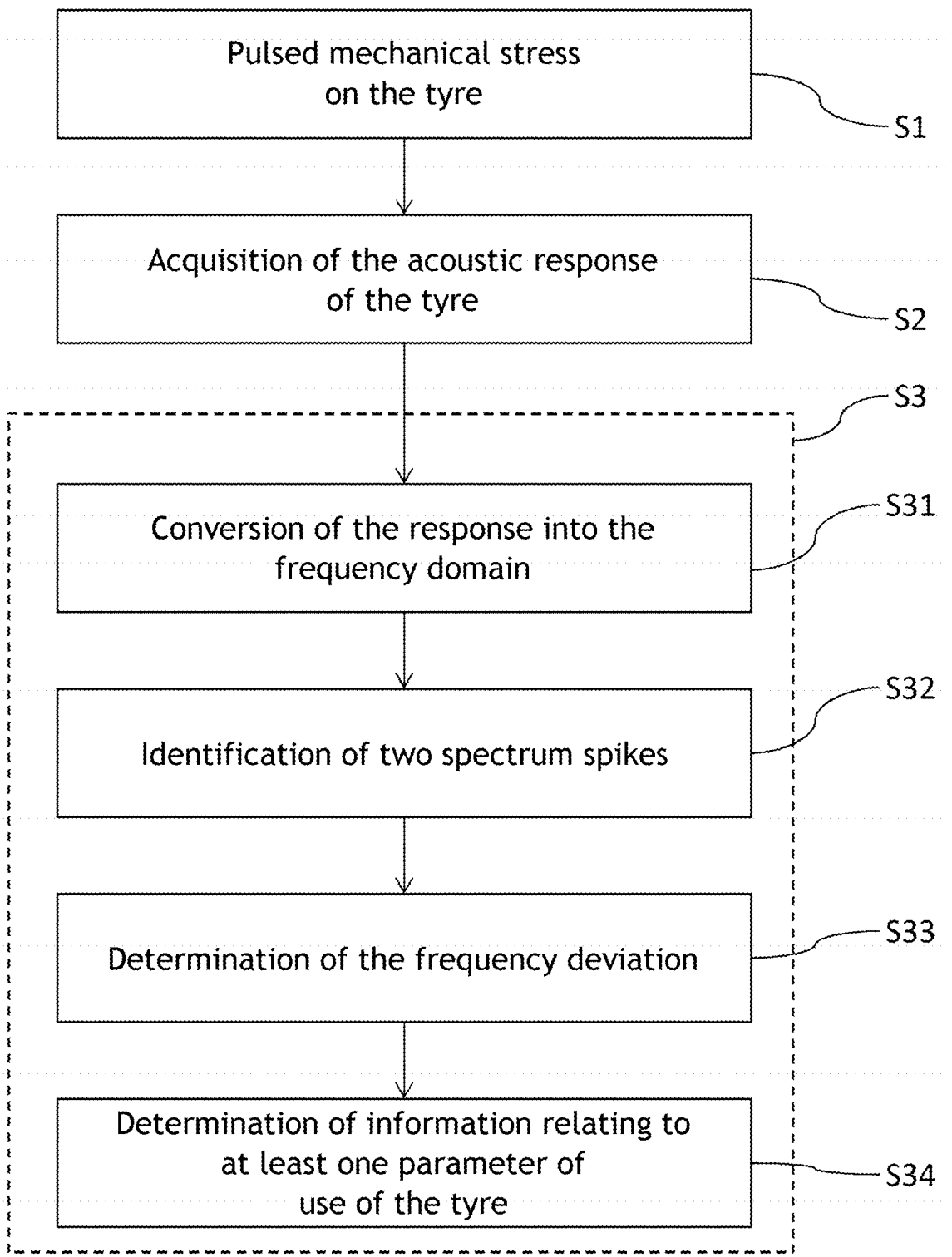
FIG. 4 is a diagram schematically illustrating several steps of a method according to a possible embodiment of the invention.

Referring to FIG. 4, the first step S1 of the method consists in applying to the tyre 1 a pulsed mechanical stress. This typically involves applying a brief blow to the tyre, for example by means of a kick given by an operator 8 to the tyre 1 as represented, or by striking the tyre 1 with a tool such as a hammer. The simplicity of this operation means that it can be implemented by the driver of the vehicle 7 as operator 8.

It is also possible, in order to better control the characteristics of the acoustic pulse, to provide a controllable mechanical device for striking the tyre 1 or the rim 2 with a predetermined force. Such a device can, for example, be arranged on the surface of the tyre 1 or of the rim 2, and, following the action of a command, a mobile member of this device strikes the tyre 1 or the rim 2.

Following this pulsed mechanical stress on the tyre 1, soundwaves are propagated in the tyre 1, producing a sound. This is the acoustic response of the tyre 1 to this pulsed mechanical stress. The second step S2 consists in the acquisition of the acoustic response of the tyre by means of the microphone 10.

Figure 5:
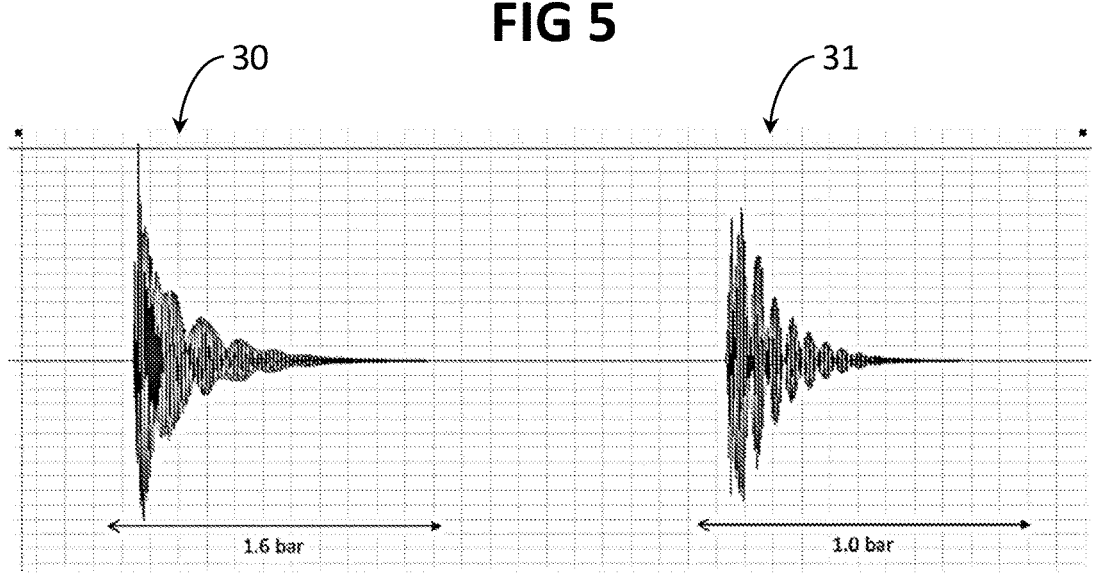
FIG. 5 illustrates a recording of two pulsed acoustic responses of tyres with the same load and different pressures.

FIG. 5 shows two illustrative examples of trends over time of amplitude of acoustic responses to a pulsed mechanical stress which have thus been acquired for one and the same tyre with constant load and at different pressures:

a first response 30, on the left of the chart, corresponding to a tyre inflated to 1.6 bar, and a second response 31, on the right of the chart, corresponding to the same tyre inflated to 1.0 bar.

The microphone 10 transmits the response to the computerized data processing unit 9 which receives said pulsed acoustic response from the microphone 10 and processes this response in the frequency domain (step S3). As stated, the transmission is preferably done by a wireless transmitter to which the microphone is linked, which makes it possible to transmit the acoustic response from the microphone situated inside the tyre 1 to a computerized data processing unit 9 situated outside of the tyre 1.

The response is first of all converted into the frequency domain (step S31) to obtain the frequency spectrum of the pulsed acoustic response. It is possible to use any conventional method, suited to the format of the data representative of the pulsed acoustic response, such as, for example, Fourier transformation, or a parametric method of the Yule-Walker or similar type.

The frequency spectrum of the pulsed acoustic response is thus obtained. From this spectrum, two spectrum spikes, in the response in the frequency domain, are identified on either side of a reference frequency corresponding to the first cavity mode of the tyre (step S32).

The inventors have in fact discovered that the frequency domain acoustic response of a tyre deformed under a load exhibits a duplication of the fundamental frequency of its first cavity mode, which is reflected in the spectrum by two nearby spikes.

Following the pulsed mechanical stress on the tyre 1, different acoustic resonance modes are excited that are linked to the geometry of the internal cavity formed by the tyre 1 and the bottom of the rim 2. The first cavity mode corresponds to the main resonance inside the tyre 1. This first cavity mode can be likened to a standing resonant wave of a tube closed on itself, which depends solely on the length of the tube when the tube is not crushed.

This first cavity mode is reflected by an amplitude spike for the fundamental frequency of this mode. This fundamental frequency can be approximated by a reference frequency $f_0$ corresponding to the ratio of the speed c of sound in air to the average internal circumference $L_c$ of the tyre 1, i.e.

$$f_0 = \frac{c}{L_c}$$

In the examples of FIG. 5, the tyre 1 has an average internal tyre circumference $L_c$ estimated at 4.05 m. By taking a speed of sound approximated at 340 m·s$^{-1}$, a reference frequency $f_0$ of approximately 84 Hz is obtained, which therefore corresponds to the fundamental frequency of the first cavity mode for this tyre 1.

Now, a tyre 1 mounted on a vehicle 7 supports a part of the weight thereof and is deformed as explained above. The main consequence of this deformation is a reduction of the inner tube section of the tyre 1, via the reduction of area of the interior of the tyre 1 in line with the rim 2, i.e. at the point of contact 6 with the ground, and an increase in the length of this tube. These geometrical changes are reflected by a "duplication" of the fundamental frequency of the first cavity mode: instead of having one spike in the spectrum of the acoustic response at the fundamental frequency, two spikes are observed, situated on either side of the fundamental frequency. It has been found that the deviation between the two spikes is a function of the intensity of the deformation of the tyre 1.

The two spikes of the spectrum of the acoustic response exhibit the same deviation relative to the reference frequency $f_0$, taken as approximation of the fundamental frequency. The frequencies of the two spikes of the spectrum therefore form a pair centered on the reference frequency $f_0$. Furthermore, the two spikes of the spectrum of the acoustic response are located at frequencies very close to the reference frequency $f_0$, taken as approximation of the fundamental frequency. Typically, the spacing of the frequency of each of the spikes relative to the reference frequency is less than 10% of the reference frequency. Furthermore, generally, each of the two spikes of the spectrum correspond to maxima of the spectrum on their respective side of the reference frequency.

It follows therefrom that the detection of the spikes of the spectrum and the identification of the frequencies corresponding to these detection spikes do not present difficulties for its implementation by the computerized data processing unit 9 configured for this purpose. In fact, the two spectrum spikes can be detected by searching for the maximum amplitude on each side of the reference frequency $f_0$ over a given range (for example not deviating on each side by more than 10% of the reference frequency), and this detection can be verified by comparing the respective deviations between the two frequencies corresponding to the two spikes of the spectrum, which should be close.

The detection of the spectrum spikes is facilitated by the good quality of the acquisition of the acoustic response for the frequencies around the fundamental frequency. In this respect, the arrangement of the microphone 10 inside of the tyre 1 allows for a quality of acquisition that is particularly suited to this application. In effect, only a microphone 10 arranged inside the tyre can reveal the duplication of the fundamental frequency of the first cavity mode, which is reflected in the spectrum by two spikes close together. Furthermore, the arrangement of the microphone 10 inside the tyre avoids the acquisition of disturbing signals.

Figure 6:
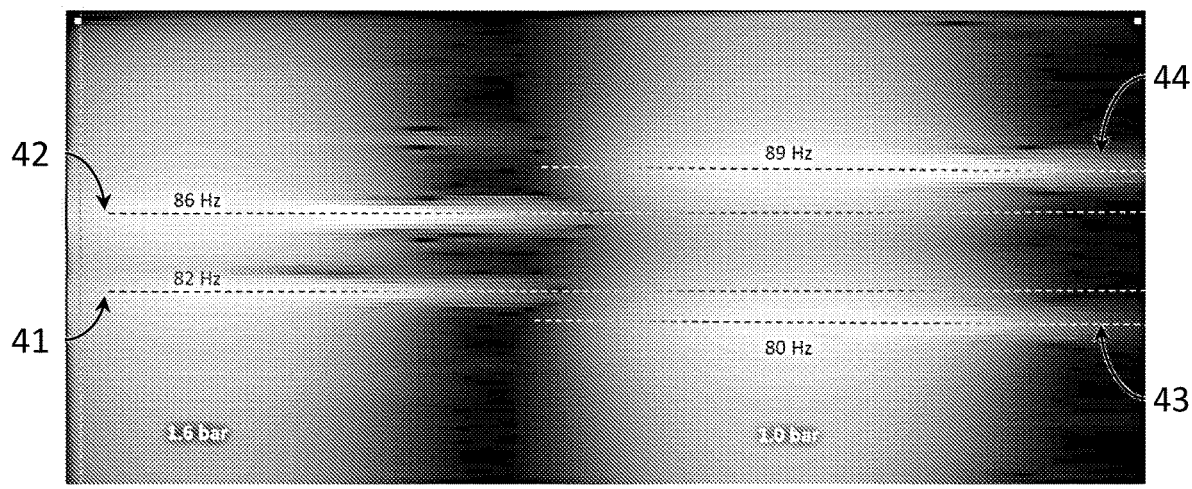
FIG. 6 illustrates the time-frequency representation of the acoustic responses of FIG. 5.

FIG. 6 illustrates the time-frequency representation of the two pulsed acoustic responses illustrated in FIG. 5. Although the fundamental frequency had been estimated as reference frequency at 84 Hz, the presence of a pair of spikes can clearly be seen around this reference frequency:

for the pressure at 1.6 bar, a first spike 41 at 82 Hz and a second spike 42 at 86 Hz, i.e. a deviation of 4 Hz, and for the pressure at 1.0 bar, a first spike 43 at 80 Hz and a second spike 44 at 89 Hz, i.e. a deviation of 9 Hz.

It can be seen that the deviation between the frequencies of the two spikes is not the same in both cases: the deviation is a function of the deformation, and therefore of the pressure and of the load. Consequently, the processing of the acoustic response of a tyre comprises a step S33 of determination of the deviation between the frequencies of the two spikes, then a step S34 of determination of information relating to at least one parameter of use of the tyre from this deviation.

Thus, for two frequencies of spikes $f_1$ and $f_2$, the following applies:

$$f_1 - f_2 = \Delta f \approx f_0 \frac{V_{cp}}{V}$$

With $\Delta f$ the deviation between the two frequencies of the spikes, $V_{cp}$ the volume of the inner tube of the deformed tyre 1, and V the total volume of the tyre when not crushed. It is therefore possible to define a deformation factor corresponding to the ratio between the deviation $\Delta f$ between the two frequencies corresponding to the first cavity mode and the reference frequency $f_0$:

$$d_f = \frac{V_{cp}}{V} = \frac{\Delta f}{f_0}$$

To return to the numeric examples described previously, the following for example applies:

for 1.6 bar:

$$\left(\frac{V_{cp}}{V}\right)_{1.6\ bar} \approx \frac{4}{84} \approx 5\%$$

for 1.0 bar:

$$\left(\frac{V_{cp}}{V}\right)_{1.0\ bar} \approx \frac{9}{84} \approx 11\%$$

As indicated above, the deformation, the pressure and the load on the axle are linked. Consequently, in addition to the deformation factor, multiple information on different parameters of use can be determined. For example, when the pressure inside the tyre 1 is known, it is possible to determine information relating to a load of the vehicle 7 as parameter of use, as a function of the deviation between the frequencies of the spikes of the spectrum and of the pressure. When the load of the vehicle 7 is known it is possible to determine information relating to a pressure as parameter of use, as a function of the deviation between the frequencies of the spikes of the spectrum and of the load of the vehicle.

Moreover, the deformation factor is itself indicative of the deformation, and can therefore directly constitute information on the deformation as parameter of use. It is also possible to deduce therefrom other parameters linked to the deformation, such as for example the deflection of the tyre 1.

The invention is not limited to the embodiment described and represented in the attached figures. Modifications are still possible, particularly from the point of view of the constitution of the various elements or through the substitution of technical equivalents, without in any way departing from the scope of protection of the invention.

The invention claimed is:

1. A method for checking and/or monitoring a use of a tire mounted on a vehicle comprising the following steps:
    acquiring, by a microphone arranged inside the tire, an acoustic response of the tire obtained by kicking or striking the tire when the vehicle is stopped; and
    processing the acoustic response in a frequency domain by a computerized data processing unit,
    wherein the processing of the acoustic response identifies, in a spectrum of the acoustic response in the frequency domain, a first spike situated on a side of a reference frequency and a second spike situated on another side of the reference frequency, said reference frequency corresponding to a first cavity mode of the tire, the first spike and the second spike in the frequency domain reflecting a duplication of the fundamental frequency of the first cavity mode of the tire due to a deformation of the tire mounted on the vehicle, and, as a function of a frequency deviation between the first spike and the second spike, determines information relating to least one parameter of use of the tire, the at least one parameter of use of the tire being related to a deformation, a load, or a pressure of the tire.

2. The method of claim 1, wherein each one of the first spike and the second spike corresponds to maxima on the respective side of the reference frequency.

3. The method of claim 1, wherein a spacing of the frequency of each of the first spike and the second spike relative to the reference frequency is less than 10% of the reference frequency.

4. The method of claim 1, wherein the information relating to the at least one parameter of use of the tire is a deformation factor corresponding to a ratio between the frequency deviation between the two frequencies of the first spike and the second spike and the reference frequency.

5. The method of claim 1, wherein the reference frequency is defined as a ratio of a speed of sound in air to an average internal circumference of the tire.

6. The method of claim 1, wherein the microphone is linked to a wireless transmitter, and the acoustic response is transmitted by the wireless transmitter to the computerized data processing unit, said computerized data processing unit being arranged outside of the tire.

7. The method of claim 1, wherein the microphone is secured to a rim bearing the tire.

8. The method of claim 1, wherein a pressure inside the tire is known, and the method further comprises determining information relating to a load of the vehicle as the at least one parameter of use of the tire, as a function of the frequency deviation between the frequencies of the first spike and the second spike and of the pressure.

9. The method of claim 1, wherein a load of the vehicle is known, and the method comprises determining information relating to a pressure as the at least one parameter of use of the tire, as a function of the frequency deviation between the frequencies of the first spike and the second spike and of the load of the vehicle.

10. A non-transitory computer-readable medium comprising program code instructions stored thereon for executing the method according to claim 1 when said non-transitory computer-readable medium is read by a computer.

11. A system for checking and/or monitoring a use of a tire mounted on a vehicle, the system comprising:
    a microphone arranged inside the tire and suitable for acquiring an acoustic response of the tire obtained by kicking or striking the tire when said tire is stopped; and
    a computerized data processing unit configured to identify, on the acoustic response in the frequency domain, a first spike situated on a side of a reference frequency and a second spike situated on another side of the reference frequency, said reference frequency corresponding to a first cavity mode, the first spike and the second spike in the frequency domain reflecting a duplication of the fundamental frequency of the first cavity mode of the tire due to a deformation of the tire mounted on the vehicle, and, as a function of a frequency deviation between the first spike and the second spike, determine information relating to at least one parameter of use of the tire, the at least one parameter of use of the tire being related to a deformation, a load, or a pressure of the tire.

12. The system according to claim 11, wherein the microphone is linked to a wireless transmitter configured to transmit the acoustic response to the computerized data processing unit, said computerized data processing unit being arranged outside of the tire.

13. The system according to claim 11, wherein the microphone is secured to a rim bearing the tire.

* * * * *